United States Patent [19]

Leonard

[11] 3,806,819

[45] Apr. 23, 1974

[54] RECEIVER INCLUDING MEANS SELECTING INTERFERENCE FREE CHANNELS

[75] Inventor: Didier Leonard, Boulogne, France

[73] Assignee: Compagnie Industriell des Telecommunications Cit-Alcatel, Paris, France

[22] Filed: May 17, 1971

[21] Appl. No.: 143,967

[30] Foreign Application Priority Data

May 15, 1970 France .............................. 70.17869

[52] U.S. Cl. .................... 325/464, 325/53, 325/452

[51] Int. Cl. .............................................. H04b 1/16

[58] Field of Search ....... 325/465, 496, 63, 56, 390, 325/332, 420, 52, 53, 427, 452, 464, 472, 473; 334/5, 18, 11

[56] References Cited

UNITED STATES PATENTS

| | | | |
|---|---|---|---|
| 3,486,118 | 12/1969 | Sonders et al. | 325/56 |
| 3,160,813 | 12/1964 | Biggi et al. | 325/56 |
| 3,617,891 | 11/1971 | Covill | 325/56 |
| 3,652,938 | 3/1972 | Byers et al. | 325/469 |
| 2,977,467 | 3/1961 | Black | 325/469 |
| 3,582,787 | 6/1971 | Muller et al. | 325/53 |

*Primary Examiner*—Robert L. Griffin
*Assistant Examiner*—Marc E. Bookbinder
*Attorney, Agent, or Firm*—Craig & Antonelli

[57] ABSTRACT

With a view to establishing radio-telephone connections between vehicles, the invention describes a device enabling the choice of a free channel, in a frequency range, which is available to a network of mobile subscribers greater in number than the channels. The choice is made initially according to a first characteristic, and if need be, according to a second characteristic having a lower quality level than the preceding one if no very good quality channel has been found.

11 Claims, 1 Drawing Figure

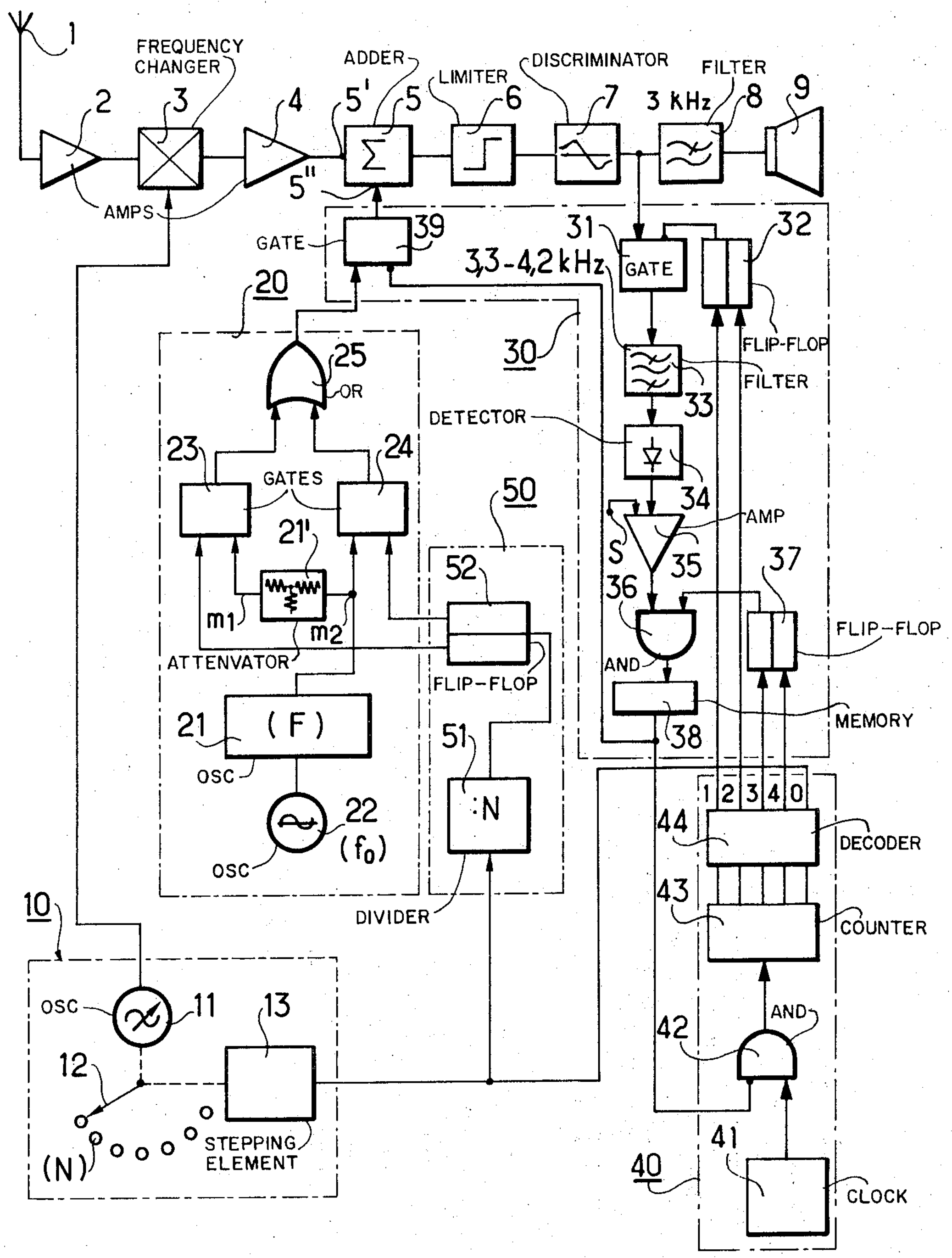
FREQUENCY CHANGER
ADDER
LIMITER
DISCRIMINATOR
FILTER
3 kHz
AMPS
GATE
3,3-4,2 kHz
GATE
FLIP-FLOP
FILTER
DETECTOR
AMP
S
AND
FLIP-FLOP
MEMORY
OR
GATES
ATTENVATOR
m1
m2
(F)
OSC
OSC
$(f_0)$
FLIP-FLOP
:N
DIVIDER
1 2 3 4 0
DECODER
COUNTER
AND
CLOCK
OSC
(N)
STEPPING ELEMENT

RECEIVER INCLUDING MEANS SELECTING INTERFERENCE FREE CHANNELS

The invention comes within the branch of radio-telephone connections between mobile radio units or between a mobile radio unit and a fixed unit. It concerns a device for selecting a free channel in a frequency range made available to a "network" of mobile radio units greater in number than the channels. The main application is in frequency modulated radio-telephone connections between mobile radio units.

Just as the number of circuits available to a telephone network to interconnect N subscribers two by two in all possible ways is much lower than $N/2$, so, taking into account the "busy" state statistic probability, to ensure radio-telephone communications handled by a network of $N$ mobile radio units, there is no need to provide $N/2$ specialized frequencies or pairs of specialized frequencies. A considerable saving of the frequency range will be made by variably selecting the carrier frequencies, it depending on the calling subscriber to seize a free channel at the time of the call. The state of a channel, free or busy, should therefore be appreciated rapidly and safely by the calling station during a preliminary frequency range scanning process. This scanning process consists in making the receiver of the calling station go through the range of the available channels and in stopping the scanning on the first available channel found.

It is therefore necessary to provide the receiver of a station wishing to send out a call to a subscriber, with a net characteristic differentiating a busy, non-available channel, from a free, available channel, for the call to be put through.

Nevertheless, the invention has a greater aim. Indeed, among the free channels, some are quite free from jamming and the limit of sensitivity of a receiver tuned to such a channel is the background noise peculiar to the receiver. Other channels, on the contrary, which are not busy, due to a connection from the network, are nevertheless encumbered by more or less intense interference or jamming due to cross-talk from one of the adjacent busy channels of the network, which have the harmonic frequency of other channels in the network or of other networks, etc. Such channels are, in principle, free, but are not pure: they can be used for a connection, but the connection will be distorted by a relatively intense noise. Now, if there is at least one pure channel in the frequency range at the time of a call sent out by a correspondent, that is the one which he should take. It is a mistake to use the first free channel found during a scan of the frequency range, if that channel is not pure, whereas there is a pure free channel.

On the other hand, if none of the free channels are pure, it is logical to establish the connection on such a non-pure free channel, the establishing of a medium-quality connection, which is the only possible thing at the instant considered, being preferable to no connection at all.

To carry out such a research program establishing a hierarchy between the pure and non-pure free channels, the invention provides a means for weighting, at two levels, at least, the noise present in a channel.

During a first scan, a pure free channel is sought. If no channel of this qualification has been found during a scan of all the available frequency range, a second scan is effected with a less severe discrimination characteristic is carried out: a non-pure free channel is then sought.

The invention concerns, mainly, frequency modulation connections. Attention is called to the fact that the demodulating of a complex of two or several frequency modulated signals, through a limiter and frequency discriminator, is clearly non-linear: if there is a strong signal and a weak signal, the weak signal is absorbed by the strong signal. For a difference of a few decibels between the levels of two competing signals, there is a complete tilting from the demodulation of the one to the demodulation of the other. A value of 10 dB can be fixed, with a good safety margin, for the difference in levels producing such a radical differentiation. The invention makes use of this non-linearity characteristic of the demodulation of a frequency modulated signal.

To weight the intrinsic quantity of noise, in a channel, arriving in a heterodyne receiver through the aerial, the invention uses the principle of an injection, in the receiver, of a medium frequency signal, for that purpose, generated locally, This medium frequency signal of frequency modulated by an identification frequency $f_0$ situated at the upper end of the acoustic band acoustic band (for example, $f_0$ = 3,750 c/s for a 300–3,000 c/s telephone band) forms a calibrated simulated received signal. In general, a 2-level identification signal may be used, although any number of levels is possible within the scope of the invention:

a. To start with, a simulated signal having a relatively low level $m_1$ is injected, and a step by step scan of the frequency range is carried out. If, on one channel, the frequency $f_0$ is received at a level exceeding a predetermined value, it is a proof that the noise arriving through the aerial is low: such a free channel is pure. If no channel is pure, the noise received through the aerial will cover the simulated signal, the frequency $f_0$ will be received at a level lower than the predetermined value.

b. In this second case, a simulated signal having a stronger level $m_2$ is injected, and a scan of the specter is again carried out. If, in these conditions, the scan provides a channel where the level of the frequency $f_0$ exceeds the said predetermined value, a non-pure free channel where the connection will be possible will have been found. If no channel is qualified in such a second scan, this shows that all the channels are busy.

The level $m_1$ will be, for example, in the order of 250 to 300 milli-volts, the level $m_2$, in the order of 2.5 to 3V. These values correspond roughly to voltages in the order of 4$\mu$V and 40 $\mu$V respectively at the input of the receiver.

The detailed discussion of the method, as well as the arrangements made for its application, will be explained with references to the annexed drawing which show an example of an embodiment of the invention.

The figure comprises only the element suitable for making it possible to understand the invention, exclusive of other devices which might exist in the receiver.

A receiver forming a part of a transmitter receiver set contains essentially an aerial 1, an HF amplifier 2, a frequency changer 3, a medium frequency amplifier 4, frequency F which, in a real case of application will have, for example, the value 11.5 Mc/s, an adding element 5 having two inputs one of which, 5', receives the output current of the amplifier 4 and the other, 5'', a simulated medium-frequency signal (see below), a limiter 6, a frequency discriminator 7, a low-pass filter 8 and a low-frequency system symbolized generally by a loudspeaker 9.

The variable local oscillator 10, which determines the channel explored, comprises an oscillator element 11 which can supply $N$ carrier frequencies corresponding to the $N$ channels scanned (for example N = 25); associated with a selector 12 having $N$ positions controlled by a step-by-step element 13.

The simulated signal having a frequency F (for example 11.5 Mc/s) is supplied by a sub-assembly 20 comprising an oscillator 21, of the VCO type, which can be frequency modulated by a frequency $f_0$ (=3,750 c/s) supplied by an oscillator. 22. The frequency F frequency modulated by $f_0$ is extracted either under a calibrated level $m_1$, or under a calibrated level $m_2$. The level $m_1$ represents an attenuated level and is provided by attenuating device 21' at the output of the oscillator 21. Two analogical gates 23 and 24 controlled by a bistable flip-flop 52 (see below) connected with an OR circuit 25, form an invertor enabling either the level $m_1$ or the level $m_2$ according to the position of the flip-flop 52 to be applied to terminal 5'' of the adding element 5.

The level selected is applied to the terminal 5'' through an analogical gate 39. (See below)

The sub-assembly 30, connected up on the output side of the discriminator 7, contains the following elements: an analogical gate 31 at the input positioned by a bistable flip-flop 32; a band-pass filter 33 bracketing the identification frequency $f_0$, for example 3.3 – 4.2 kc/s for a frequency of $f_0$ = 3.75 kc/s; a detector 34; a threshold amplifier 35 of a type known in itself, allowing only the higher levels to pass at a determined level, an AND gate 36 positioned by a bistable flip-flop 37 and having its output connected to a memory 38. The output of the memory 38 is used for positioning an analogical gate 39, inserted between the OR circuit 25 and the input 5'' of the adding element 5.

A pulse generator assembly 40 comprises a clock 41 followed by an AND gate 42, which has an inhibiting input connected up to the output of the memory 38; a counter 43 having five positions followed by a decoder 44 with five output positions designated by the numerical references 1, 2, 3, 4, 0. The positions 1, 2 of the decoder 44 control two inputs of the said bistable flip-flop 32; the positions 3, 4 of the decoder 44 control two inputs of the said bistable flip-flop 37; the output 0 of the decoder 44 supplies an advance pulse which is applied to the step-by-step element 13 having $N$ positions.

The apparatus comprises yet another sub-assembly 50 formed by a divider 51 dividing by $N$ which receives the advance pulses supplied by the position 0 of the decoder 44, and by a bistable flip-flop 52 which is inverted at each output pulse of the divider 51. This bistable flip-flop 52 positions, through its two outputs, analogical gates 23 and 24.

It will be noted that the analogical gate 39 and the AND gate 42 each have an inhibiting input, i.e., when the memory 38 marks 1, the analogical gate 39 and the AND gate 42 are nonconductive. Likewise, the gate 31 has inhibiting input.

Operation is as follows:

The gate 23 is conductive, the gate 24 is nonconductive, the low or attenuated level of the $m_1$ calibrated signal is applied at 5'' to the summation device 5.

The selector 12 having been positioned by the step-by-step element 13 in a new position, by an advance pulse (see below) a new cycle of five clock pulses begins; between pulses 1 and 2 of this new cycle, the gate 31 is nonconductive: to proceed with the evaluation, it is necessary to wait until the switching transients are extinguished. The analogical gate 31 is conductive during the remainder of the cycle which follows pulse 2. The AND gate 36 is conductive between pulse 3 and pulse 4: it is during that time that the weighting, carried out in circuit stability conditions, is used.

Let us call $U_0$ the output voltage of the oscillator 21 applied at 5''; $U_d$ the output voltage of the discriminator corresponding to $U_0$; $B_0$, the jamming voltage at the input 5' of the adder 5; $B_d$, the output voltage of the discriminator corresponding to $B_0$; $D$, the output voltage of the discriminator in a general way.

In general, we have $D = f(U_0, B_0)$.

It can be allowed that for $U_0 > 3B_0$, we have $D = f(U_0) = U_c$;

for $U_0 < 3B_0$, we have $D = f(B_0) = B_d$.

Now $B_d$ has, in general, a spread frequency range (jamming) frequency range), whereas due to its form of construction, the frequency range of $U_d$ is reduced to a line. The maximum amplitudes of $B_d$ and of $U_d$ being, in principle, equal (effect of the limiter), a band-pass filter 33 having a narrow band, of central frequency $f_0$ (3,750 c/s, for example) will transmit to the detector 34 a high $U_d$ component if there is $U_0$ at the input, but a much lower component in the presence of a spread input frequency range $B_0$.

The differentiation will be all the more effective as the filter 33 has a narrower band pass. It is useful to give the filter 33 narrowness which could be critical from the point of view of stability of the oscillator 22 at a frequency $f_0$. A band width ratio of 10 (voltage surge) is sufficient. This value is even exceeded in the example of the figure if it is admitted that the band width at the output of the discriminator 7 is in the order of 20,000 c/s whereas the filter 33 has a band pass of 3.3 to 4.2 kc/s, which is a band width of 900 c/s.

The injection level being fixed firstly, at the low value $m_1$, if, for a position of the frequency selector 12, the output level of the detector 34 is higher than the threshold value S, during the weighting time (3–4) the memory 38 is brought to state 1. At that moment, the AND gate 42 is and stays nonconductive, the clock pulses no longer reach the counter 43. The channel corresponding to the present position of the selector 12 is adopted for the connection. At the same time, the analogical gate 39 being nonconductive by the 1 of the memory 38, the injection of the calibrated signal in the receiver is stopped.

If the output level of the detector 34 is not greater than the threshold value S, the memory 38 remains at zero, after pulse 4, the pulse called zero (the fifth of the cycle) reaches the counter, this being an advance pulse which, applied to the step-by-step element 13, makes the position of the selector 12 advance by one row. A new weighting takes place between pulses 3 and 4 of the new cycle. And so on, until a pure free channel has been found.

At the same time, each advance pulse is applied to the divider. A counter 51, after having explored the $N$ channels of the frequency range, assumes the digital state $N$ (or, as the case may be, zero). For that singular state, the counter 51, equipped as a divider by $N$, supplies an output pulse which inverts the position of the bistable flip-flop 52. The result is that, now, the gate 23 is closed and the gate 24 is conductive: the large or unattenuated calibrated level $m_2$ is applied to the summing element 5.

A new scan of the frequency range begins in these new conditions. If a free channel is found, it will be a non-pure, free channel, which will supply an allowable quality connection.

If no channel is qualified in that second scan, it is the sign that all the channels have high interference or are busy. In principle, that situation should not arise if the network has been properly dimensioned.

When the subscriber replaces his hand-set, the memory 38 is put back to zero, as well as the flip-flop 52.

The invention enables the quality of a radiocommunication connection at variably selected frequencies to be improved systematically by taking advantage of the non-linear characteristics of the frequency modulation, by the fact that it has a tendency to prevent subscribers who are close together, from the geographical point of view, when engaged in different communications, from choosing channels which are adjacent in frequency, and, by that fact, non-pure, as long as there are free channels called pure.

I claim:

1. In a heterodyne receiver having a variable local oscillator, an intermediate frequency amplifying stage, a device for selecting a pure free channel in a frequency range made up of N channels for frequency modulation connections, comprising signal generator means for generating a calibrated frequency modulated signal with first and second intensity levels at the intermediate frequency of the receiver and for injecting said calibrated signal at a selected one of said first and second intensity levels into an input stage of said receiver, detector means connected to an output stage of said receiver for detecting the level of the signal derived from said receiver in comparison with a reference value, and control means for controlling said variable local oscillator to sequentially scan said $N$ channels during the injection of said first intensity level and then to sequentially scan said $N$ channels during the injection of said second intensity level, said control means being deactivated by said detector means upon detection of a derived signal level from said receiver in excess of said reference value.

2. A heterodyne receiver as defined in claim 1, wherein said control means includes first means for controlling said signal generator means to apply said first signal level to said receiver and second means responsive to a complete scan of said $N$ channels for switching said first means to apply said second signal level to said receiver, said second signal level being higher than said first signal level.

3. A heterodyne receiver as defined in claim 2, wherein said second signal level is approximately 20 decibels higher than said first signal level.

4. A heterodyne receiver as defined in claim 2, wherein said signal generator means includes an intermediate frequency signal generator modulated by a signal frequency in the upper portion of the low frequency signal range of said receiver.

5. A heterodyne receiver as defined in claim 4, wherein said first means includes a two-position switching means for controlling said signal generator means to provide said first and second intensity levels.

6. A heterodyne receiver as defined in claim 5, wherein said detector means includes a narrow band filter selecting said signal frequency, a detector connected to the output of said narrow band filter, a threshold amplifier comparing the output of said detector with said reference value and a memory element which provides a control output when the output of said filter has a level exceeding said reference value.

7. A heterodyne receiver as defined in claim 6, wherein said control means is responsive to the control output of said memory element for stopping said scanning of said $N$ channels.

8. A heterodyne receiver as defined in claim 6, wherein said control means includes a clock pulse generator connected to the input of a counter, an advancing output of said counter controlling the scanning of said $N$ channels by said local oscillator.

9. A heterodyne receiver as defined in claim 8, wherein said control means further includes a divider having a capacity $N$ connected to said counter so as to generate a switching signal after $N$ advancing outputs of said counter, said switching signal actuating said two-position switching means.

10. A heterodyne receiver as defined in claim 1, wherein said control means includes means for first scanning said $N$ channels with injection of said first level signal and means responsive to the first scanning of said $N$ channels without said detector means detecting a signal level exceeding said reference value for scanning said $N$ channels a second time with injection of said second level signal.

11. In a heterodyne receiver having a variable oscillator, an intermediate frequency amplifying stage, a demodulator stage including a frequency discriminator, a device for selecting a pure channel or a free channel in a frequency range made up of $N$ channels for frequency modulation connections, comprising signal generator means including attenuating means for generating a calibrated frequency modulated signal and providing outputs of a simulated signal at the intermediate frequency of the receiver at a first attenuated intensity level and a second unattenuated intensity level, said signal generator means injecting the simulated signal at a selected one of the first attenuated intensity level and the second unattenuated intensity level into an input stage of said receiver, detector means connected to an output stage of said receiver for detecting the level derived from said frequency discriminator, comparison means for comparing said detected level with a reference value, and control means for controlling said variable local oscillator to sequentially scan said $N$ channels when injecting the first attenuated intensity level and then to sequentially scan said $N$ channels when injecting the second unattenuated intensity level, said control means being deactivated by said comparison means to stop the sequential scan upon said detected level being in excess of said reference value.

* * * * *